United States Patent [19]

Gouttebessis

[11] Patent Number: 4,523,619

[45] Date of Patent: Jun. 18, 1985

[54] PROTECTIVE PLY FOR TIRE CROWN OF THREE-DIMENSIONAL STRUCTURE

[75] Inventor: Jacques Gouttebessis, Volvic, France

[73] Assignee: Compagnie Generale Des Etablissements Michelin, Clermont-Ferrand, France

[21] Appl. No.: 538,978

[22] Filed: Oct. 4, 1983

[30] Foreign Application Priority Data

Oct. 22, 1982 [FR] France ................. 82 17963

[51] Int. Cl.³ ............................................. B60C 9/18
[52] U.S. Cl. ................... 152/527; 152/530; 152/563; 139/408
[58] Field of Search ........ 152/330 R, 354 R, 354 RB, 152/355, 356 R, 356 A, 357 R, 358, 359, 361 R, 361 FP, 361 DM; 139/408, 411, 413, 423

[56] References Cited

U.S. PATENT DOCUMENTS

| 876,616 | 1/1908 | Zeglen | 152/358 |
| 3,774,662 | 11/1973 | Neville et al. | 156/148 |
| 3,900,062 | 8/1975 | Neville et al. | 52/361 FP |
| 4,050,973 | 9/1977 | Neville et al. | 156/123 |

FOREIGN PATENT DOCUMENTS

| 220309 | 2/1959 | Australia | 152/361 |
| 532985 | 11/1954 | Belgium | 152/361 |
| 1035682 | 8/1978 | Canada | 152/361 DM |
| 2458275 | 6/1976 | Fed. Rep. of Germany | 152/361 |
| 1309356 | 10/1962 | France . |
| 1526185 | 5/1968 | France . |
| 2398623 | 2/1979 | France . |
| 2421969 | 11/1979 | France . |
| 2493236 | 5/1982 | France . |
| 76739 | 2/1977 | Luxembourg . |
| 1566328 | 4/1980 | United Kingdom . |
| 2066308 | 7/1981 | United Kingdom . |

Primary Examiner—Lois E. Boland
Attorney, Agent, or Firm—Brumbaugh, Graves, Donohue & Raymond

[57] ABSTRACT

A tire with a crown comprising a strengthening reinforcement and at least one protective ply arranged above the strengthening reinforcement is characterized by the fact that the protective ply has the following features: it comprises a three-dimensional fabric impregnated with rubber; the fabric comprises warp threads and woof threads; the warp threads and the woof threads undulate; the warp threads and the woof threads are made with one or more materials whose rupture stress is less than 140 kg/mm²; and the porosity of the fabric before impregnation with rubber varies from 60% to 90%.

8 Claims, 5 Drawing Figures

PROTECTIVE PLY FOR TIRE CROWN OF THREE-DIMENSIONAL STRUCTURE

The invention relates to tires. The invention relates in particular to tires having a reinforcement intended to make their crown rigid in order to permit the crown to withstand the stresses due to travel. This reinforcement is referred to as a strengthening reinforcement below, but it is at times also called a "working reinforcement" or "crown reinforcement" in the tire industry. This reinforcement generally consists of several superimposed plies on the inside of the crown, each ply having wires or cables, for instance of metal, which are parallel to each other and cross the wires or cables of the other plies. Such strengthening reinforcements are described, for instance, in French Pat. Nos. 1,309,356 and 2,398,623.

When such tires travel on surfaces which have aggressive roughnesses or when they accidentally encounter obstacles, these roughnesses or obstacles may cause damage to the crown of the tires, this damage being due either to perforations of the strengthening reinforcement or excessive deformations of the strengthening reinforcement or cracks in the rubber of the crown as a result of impacts.

In order to try to avoid or limit this damage, it is known to use one or more so-called "protective plies" arranged between the tread and the strengthening reinforcement.

It is known to use protective plies comprising cables which are parallel to each other in each ply and form a slight angle, for instance less than 30°, with the equatorial plane of the tire, these cables being in particular of metal in order better to withstand the assaults.

These protective plies are characterized by a lack of flexibility which frequently results in a breaking of the cables of these plies and a channeling of water along the broken cables which leads to corrosion of the plies. It has been attempted to remedy these drawbacks by using elastic cables in these protective plies, as described, for instance, in French patent application No. 81 20 753 published under No. 2,493,236. This technique makes it possible to decrease the longitudinal stiffness of the cables, which reduces the breaks in these cables, but an excessive rigidity in thickness is still present in these plies which causes a compression of the rubber between these cables and the obstacles upon travel and therefore a deterioration of the rubber with the formation of cracks through which water penetrates which is channeled along the cables and therefore causes corrosion of the plies.

It has been proposed to use helically undulated wires which are isolated from each other or bundles of undulated wires for the production of protective plies. One such technique is described, for instance, in British Pat. No. 1,566,328. This technique, which can be used only with reinforcing filaments whose rupture stress is at least equal to 140 kg/mm$^2$, makes it possible to obtain relatively flexible protective plies, but the undulations create zones of weakness in the rubber adjacent these wires since rubber bridges of different widths are thus formed. These zones of weakness due to the wider bridges are sensitive to rupture or perforation so that the protective plies used at present practically all have cables without undulation and parallel to each other as described above, with the drawbacks previously mentioned. The object of the present invention is to overcome these drawbacks.

Therefore, the ply in accordance with the invention, which is intended to be used as protective ply in the crown of a tire, is characterized by the fact that it is formed at least in part by a three-dimensional fabric.

The invention also concerns plies of this type impregnated with at least one rubber as well as tires employing at least one protective ply in accordance with the invention.

The embodiments of the invention which follow as well as the entirely schematic figures of the drawing corresponding to these embodiments are intended to illustrate the invention and to facilitate an understanding thereof without, however, limiting its scope.

Figure 1:
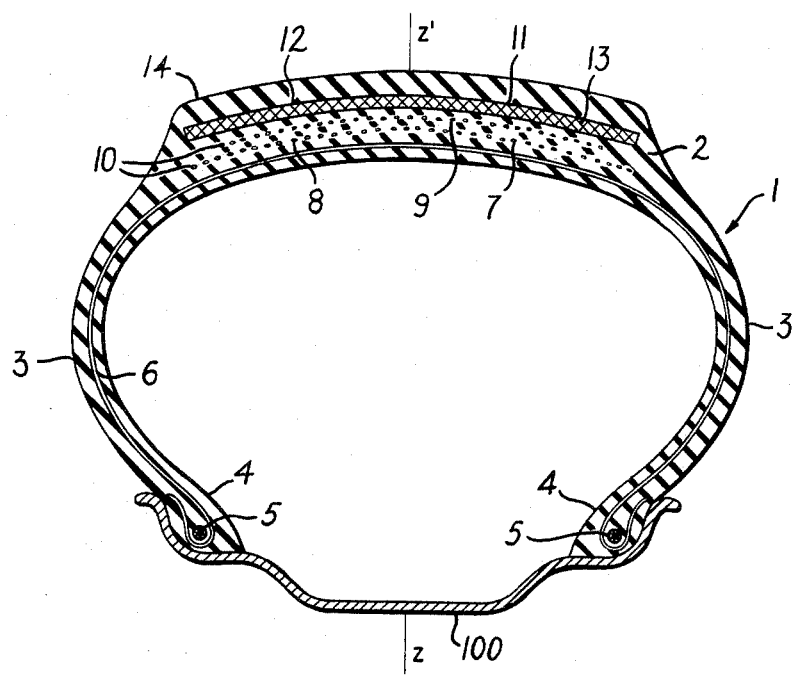
FIG. 1 shows, in radial section, a tire according to the invention having a strengthening reinforcement and a protective ply.

FIG. 1 shows a tire 1. This tire 1 is shown mounted on a rim 100 and inflated. This tire 1 has a crown 2, two sidewalls 3, two beads 4, each bead 4 being, for instance, reinforced by a bead ring 5. A radial carcass ply 6 extends from one bead 4 to the other surrounding the bead rings 5 in known manner. The crown 2 comprises a strengthening reinforcement 7 formed, for instance, in known manner, of two superimposed plies 8, 9, so-called "working plies", each of these plies having wires or assemblies of wires 10 parallel to each other and crossing the wires or assemblies of wires 10 of the other ply.

By way of example, these elements 10 are metal cables but one could use other elements 10, for instance single metal wires, wires or assemblies of wires made with a nonmetallic material, for instance an organic polymer.

The expression "crown" is to be understood in a very general sense and includes not only the portion of the tire 1 which is directly above or below the strengthening reinforcement 7 but also what is at times known as the "shoulders" of the tire 1, that is to say the upper side portions of the tire 1 which are in contact with the sidewalls 3.

Figure 2:
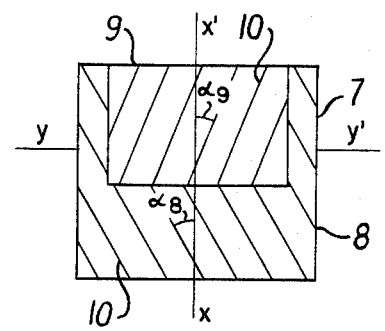
FIG. 2 shows, in top view, a portion of the strengthening reinforcement used in the tire shown in FIG. 1.

FIG. 2 shows, in top view, a portion of the plies 8, 9, the entire portion of the crown 2 located above these plies being assumed removed. The cables 10 of the ply 8 form an acute angle $\alpha_8$ with the equatorial plane of the tire 1, this equatorial plane being the plane perpendicular to the axis of revolution of the tire 1 and passing through the middle of the crown 2. In FIG. 2, this equatorial plane is indicated by the line xx' and the axis of revolution of the tire 1 is indicated by the line yy', the equatorial plane being indicated by the line zz' in FIG. 1.

The cables 10 of the ply 9 form an acute angle $\alpha_9$ with the equatorial plane xx'. These angles $\alpha_8$, $\alpha_9$ are arranged on opposite sides of the equatorial plane xx', each of these angles being, for instance, between 15° and 30°. For clarity of the drawing, the cables 10 have been shown in each ply 8, 9 further apart than they actually are. The plies 8, 9 are arranged above the carcass ply 6, that is to say the radial distances of these plies are greater than the radial distance of the carcass 6. It may be advantageous to use furthermore other plies in the strengthening reinforcement 7, for instance one or more triangulation plies, the cables of which are substantially perpendicular to the equatorial plane, these plies being in particular located below the plies 8, 9. Such known plies have not been shown in the drawing for purposes of simplification.

Above the strengthening reinforcement 7 there is a protective ply 11 in accordance with the invention, that is to say the radial distance of this protective ply 11 is greater than the radial distances of the plies 8, 9. All of these radial distances are by definition measured with respect to the axis of revolution yy' and in the equatorial plane, these radial distances not being shown in the drawing for purposes of simplification. This protective ply 11 is formed of a fabric 12 impregnated with a rubber 13. Above the protective ply 11 there is the tread 14, that is to say the rubber intended to come into contact with the surface on which the tire 1 travels. The rubbers 13, 14, in the same way as the other rubbers used for the production of the tire 1, contain in known manner one or more elastomers. A portion of the fabric 12 of the protective ply 11 is shown in greater detail in cross-section in FIG. 3 and in top view in FIG. 4. This fabric 12 has two principal faces 15, 16. These faces 15, 16 are shown in the form of dashed lines in FIG. 3, these faces being then flat, that is to say the fabric 12 is shown in these FIGS. 3 and 4 before its use in the crown 2, its general orientation being then flat.

The thickness "e" of the fabric 12 is the distance between the faces 15, 16, this thickness "e" corresponding in practice to the radial thickness of the protective ply 11 in the crown 2.

The fabric 12 comprises warp threads 17 and woof threads 18.

Figure 3:
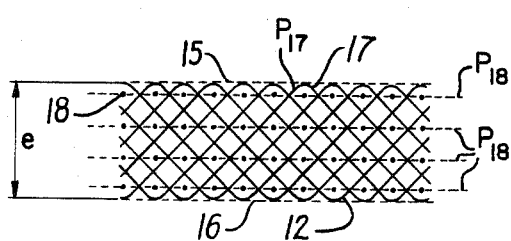
FIG. 3 shows a section through a portion of the fabric of the protective ply used in the tire shown in FIG. 1, this section being taken along the line III—III of FIG. 4.
Figure 4:
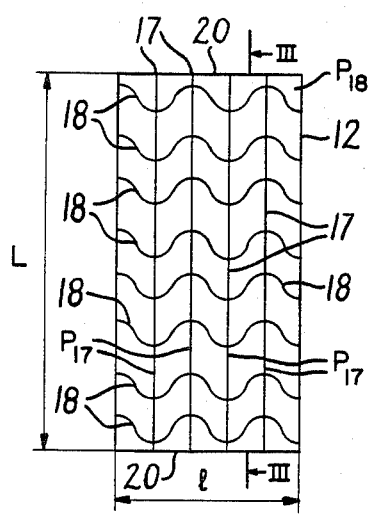
FIG. 4 shows, in top view, the fabric shown in part in FIG. 3.

Each warp thread 17 undulates in a plane $P_{17}$ perpendicular to the faces 15, 16, this warp thread 17 being alternately tangent to one of the principal faces 15, 16 and then to the other (FIG. 3), this warp thread 17 having an average orientation in the direction of the length "L" of the fabric 12 (FIG. 4). The woof threads 18 are arranged between the warp threads 17, in several planes $P_{18}$ in the thickness "e", these planes $P_{18}$ being parallel to the principal faces 15, 16.

The planes $P_{17}$ are represented by solid lines in FIG. 4 and the planes $P_{18}$ are represented by dashed lines in FIG. 3. The fabric 12 is therefore three-dimensional.

Each woof thread 18 is undulated in a plane $P_{18}$ as shown in FIG. 4, this woof thread 18 having an average orientation in the direction of the width "l" of the fabric 12. In this plane $P_{18}$ there is a plurality of woof threads 18 and preferably the woof threads 18 of this plane $P_{18}$ are in phase, as shown in FIG. 4, two such successive woof threads 18 then corresponding by a simple translation in the direction of the length "L".

The structure of the fabric 12 is thus the same as that described in French Pat. No. 1,526,185, with the difference that the woof threads 18 of the fabric 12 are undulated. For clarity of the drawing, the warp threads 17 and woof threads 18 have been shown further apart than they actually are, and the woof threads 18 have been represented by dots in FIG. 3. The undulations of the threads 17, 18 may possibly be formed in part by practically straight lines.

When the protective ply 11 is incorporated in the tire 1, the width "l" corresponds, except for shaping deformations, to the width of the ply 11 measured on said ply and in a plane containing the axis of revolution yy', while the direction of the length "L" corresponds to the longitudinal direction of the crown 2, this direction being parallel to the equatorial plane. It goes without saying that the relative proportions of the values of "l" and "L" may be any whatsoever.

Figure 5:
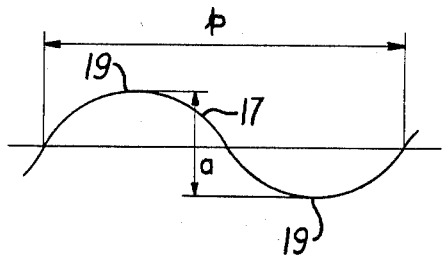
FIG. 5 shows in detail the undulation of a warp thread of the fabric shown in part in FIGS. 3 and 4.

By way of example, the characteristics of the protective ply 11 are the following when it is developed in such a manner that its principal faces 15, 16 are flat, that is to say before its incorporation in the tire 1:

geometrical dimensions of the fabric 12 (these dimensions being those of the ply 11 with its impregnation rubber 13): width: 100 mm; thickness: 2.3 mm; length: 3.5 m;

the material used for the warp threads 17 and the woof threads 18 has a rupture stress less than 140 kg/mm$^2$; this material is, for instance, nylon-6,6 shrunk at 150° C. for one hour, this nylon after shrinkage having a rupture stress of 50 kg/mm$^2$ and a rate of elongation upon rupture of 42%;

the threads 17, 18 are each formed of a single unitary thread of a diameter of 0.22 mm; the number of warp threads 17 is 560 threads per 100 mm of fabric 12 and the number of woof threads 18 is 240 threads per 100 mm of fabric 12; the counting of the threads 17, 18 is effected over the entire thickness "e" in a plane perpendicular to the principal faces 15, 16, this plane being oriented either in the direction of the width "l" for the counting of the warp threads 17 or in the direction of the length "L" for the counting of the woof threads 18, the distance of 100 mm being measured at the intersection of the plane in question with a principal face 15, 16;

the undulation of each thread 17, 18 is characterized by an undulation rate $T = a/p$, "a" being the amplitude of the undulation measured between two successive crests and "p" being the wavelength of this undulation; FIG. 5 shows by way of example the amplitude "a" and the wavelength "p" for a warp thread 17, two successive crests of the undulation being marked 19; the warp threads 17 have a rate T equal to 18% and the woof threads 18 have a rate T equal to 5%; for clarity in the drawing, the undulations of the threads 17, 18 have been exaggerated in FIGS. 3, 4 and 5;

there are four planes $P_{18}$ of woof threads 18 in the thickness "e";

porosity of the fabric 12: about 76%, this porosity P, determined by calculation, being equal to the ratio v/V, "v" being the void volume of the fabric and "V" the total volume of the fabric, that is to say the sum of the void volume "v" and of the volume occupied by the woof threads 18 and the warp threads 17;

rubber 13 impregnating the fabric 12: mixture having a base of vulcanized natural rubber, this mixture before vulcanization containing ingredients currently used in the rubber industry, for instance sulfur, vulcanization accelerators, and carbon black, and having after vulcanization a Shore A hardness of about 50.

The protective ply 11 in accordance with the invention is compared with a known protective ply, the characteristics of which are as follows when this known protective ply is developed in such a manner that its principal faces are flat, that is to say before its incorporation in the tire:

geometrical dimensions: identical to those of the ply 11 according to the invention;

this known ply is reinforced by elastic steel cables, the volume of the steel cables being identical to that of the warp threads 17 and woof threads 18 of the ply 11 according to the invention, that is to say the porosity P is the same for these two plies. These cables make a small angle with respect to the longitudinal direction of the ply, this angle being about 20°. These cables are arranged in a single plane parallel to the principal faces of the ply, over the entire width of said ply; each cable has three strands, each strand being formed of seven wires of a diameter of 0.23 mm; the winding pitch of the wires of each strand is 4 mm and the winding pitch of the strands is 6 mm;

rubber impregnating the steel cables: rubber composition similar to that of the ply 11 in accordance with the invention, the Shore A hardness of this vulcanized composition being 80.

The properties and the performances of these plies are then compared, on the one hand, when they are isolated and, on the other hand, when they are each incorporated in a tire. In this example, the impregnation of the fabric 12 by the rubber 13 is assumed to take place before the incorporating of the ply 11 in the tire 1, but it goes without saying that this impregnation could be effected upon the incorporating of the ply 11 in the tire 1, the ply 11, before this incorporation, being then formed solely by the fabric 12.

1. Comparison of the Isolated Plies 1.1 Ratio of the masses of the reinforcement elements: mass of steel/mass of nylon-6,6 = 6.5;

1.2 Ratio of the rupture stresses C of the steel wires and of the nylon-6,6 threads:

C steel wires/C nylon-6,6 threads = 5, the steel having a rupture stress of 250 kg per mm$^2$;

1.3 Rate of elongation upon rupture $\epsilon_R$ of the steel wires and the nylon-6,6 threads:

steel wires: 1-2% nylon-6,6 threads: 42%;

1.4 Ratio of the flexibilities $S_e$ of the plies in the direction of the thickness "e":

$S_e$ known ply/$S_e$ ply 11 = 0.6.

Each flexibility $S_e$ is determined by measuring the force F necessary to cause a rigid cylinder of a diameter of 10 mm to penetrate into each ply over a distance $\Delta_e$ equal to 40% of the thickness of each ply, the axis of the cylinder being perpendicular to the principal faces of the ply in question; $S_e$ is defined, for each ply, by the ratio $S_e = \Delta_e/F$;

1.5 Ratio of the perforation energies W of the plies:

W known ply/W ply 11 = 1.5.

Each energy W is determined by dropping from a height of 25 cm a hemispherical part of radius 4 mm, the weight of the part varying so that the perforation can take place; this perforation is obtained by the impact of the hemispherical portion of the part on a tested rectangular ply surface (100×110 mm$^2$), this surface being held stretched on two opposite sides spaced 110 mm apart and perpendicular to the direction of the length of the ply in question.

The flexibilities $S_e$ and the perforation energies W are determined on plies whose impregnation rubbers have been vulcanized after impregnation.

The comparison of these results permits the following remarks:

The known ply with steel cables is characterized by better resistance to perforation than the ply 11 in accordance with the invention.

The ply 11 in accordance with the invention is characterized by greater lightness and greater flexibility $S_e$ than the known ply.

2. Comparison of the Plies when they are Incorporated in a Tire

Each of the two plies described above is incorporated in a tire, joining the longitudinal ends of the plies together end to end so as to form an endless ply, these ends of the ply 11 being marked 20 in FIG. 4. The arrangement of each protective ply in the tire is the same as that described previously and shown in FIG. 1, the width of each of these plies, measured on the ply in a plane containing the axis of revolution yy', being 100 mm, the radial thickness of this ply being 2.3 mm, the length of this ply, measured in the equatorial plane along the ply, being about 3.5 meters.

In the vicinity of the equatorial plane of the tire 1, the fabric 12 has the following characteristics: The warp threads 17 are undulated in planes which are parallel to the equatorial plane, and the woof threads 18 are undulated in cylinders whose axis is the axis of revolution yy' of the tire, the woof threads 18 of each cylinder being preferably in phase, that is to say two such woof threads 18 correspond by a simple rotation of axis yy', the other geometrical characteristics of these warp threads 17 and these woof threads 18 being the same as those described previously in the event that the fabric 12 has flat principal faces 15, 16.

In the tire 1, each of the cylinders in which woof threads 18 undulate corresponds to a plane $P_{18}$, that is to say there are four of these cylinders in the case of the fabric 12 whose characteristics have been given previously by way of example. The fabric 12 therefore retains a three-dimensional structure in the finished tire.

The tires comprising either the known protective ply or the ply 11 are distinguished only by the protective ply. All the other constituents are identical. These tires are of size 1100-20 and each strengthening reinforcement 7 of the tires comprises four plies; namely:

two working plies 8, 9; the cables 10 of each of these two plies 8, 9 form an angle $\alpha_8$, $\alpha_9$ equal to 20° with the equatorial plane, the cables being crossed from one ply to the other; the steel cables 10 of these plies 8, 9 are each formed of 27 wires of a diameter of 0.23 mm in each ply 8, 9; the axes of two adjacent cables 10 are separated by a distance of 2.5 mm; the upper ply 9 has a width of 160 mm and the lower ply 8 has a width of 180 mm, these widths being measured on the plies in question, in a plane containing the axis of revolution yy';

two triangulation plies each arranged on one side of the crown between the working plies 8, 9 and the carcass 6; these two triangulation plies, arranged on opposite sides of the equatorial plane, have steel cables identical to the cables 10 of the working plies 8, 9, the cables of these triangulation plies being substantially perpendicular to the equatorial plane; the width of each of these plies, measured on the ply in a plane containing the axis of revolution yy', is 60 mm.

These tires are used under the same conditions until the depth of the tread pattern is 1 mm.

Each of these tires is inflated to 8 bars and is caused to travel at 50 km/hour under a load of 3250 kg on a flywheel equipped with an ogival protuberance of a height of 37 mm, the flywheel and the protuberance being identical in the two tests.

The number $N_1$ of cables touched and the number $N_2$ of cables broken after each passage over the protuberance are then counted in the upper working ply 9. The results are given in the following table:

|  | $N_1$ | $N_2$ |
|---|---|---|
| Known protective ply | 5 | 4 |
| Protective ply 11 | 3 | 3 |

The protective ply 11 according to the invention therefore makes it possible to decrease by 40% the number of cables touched and to decrease by 25% the number of cables broken in the upper working ply 9. It is furthermore noted that at the points of impact of the protuberance, the tread 14 has much less marked cracks when using the ply 11 according to the invention than when using the known protective ply. It follows that the ply 11 of the invention very substantially decreases the damage to the strengthening reinforcement 7 due to impacts, as well as the risks of corrosion due to the migration of water in the cracks of the rubber and along the touched or broken metal cables.

This result is surprising since the comparison of the isolated plies previously described shows that the known ply resists perforation better than the ply according to the invention.

This result is due to the three-dimensional structure of the fabric 12 and, more particularly, to the fact that the threads 17, 18 of this fabric are undulated.

In addition to the effective protection of the crown, the ply 11 has the advantage of being easy to produce by weaving and of being capable of being easily incorporated in a tire without danger of displacement or deformation upon this incorporation.

In the ply 11 according to the invention, the threads 17, 18 have been described as each consisting of a single unit thread. It goes without saying that each of these threads may also be formed of an assembly of a plurality of individual threads so as to form, for instance, a cable.

The fabric 12 of the ply 11 may be made with materials other than nylon-6,6, for instance inorganic material, in particular glass, or a metal material, in particular steel, but in this case it is preferable to use single threads in order to limit the migration of water along the metallic material and thus limit the corrosion.

The invention has the advantage of permitting the production of the fabric 12 with materials whose rupture stress is less than 140 kg/mm$^2$, in particular organic polymers; now the use of organic polymers is very advantageous since this favors the lightness and resistance to corrosion of the tires and furthermore the elongation upon rupture and the rupture stress of the warp threads 17 and of the woof threads 18 can be varied within wide limits.

In addition to the nylon-6,6 previously mentioned, one may use other organic polymers such as, for instance, other polyamides, in particular the aromatic polyamides, polyesters, polyimides, vinyl polymers or acrylic polymers, or rayon. It goes without saying that the ply 11 may comprise threads made with at least two different materials, for instance warp threads of polyester and woof threads of nylon-6,6.

The rubber 13 which impregnates the fabric 12 of the protective ply 11 should be sufficiently flexible to permit the deformations of this ply. The Shore A hardness of this rubber after vulcanization for this reason preferably varies from 40 to 70 and advantageously from 50 to 60. The porosity of the fabric 12 must be sufficient to permit migration of the rubber 13 throughout the entire fabric, this porosity varying, for instance, from 60% to 90%.

The width of the protective ply 11 may be variable. Thus this width may be less than, equal to or greater than the width of the closest working ply 9. However, it is preferable for the width of the ply 11 to be at least equal to one-half of the width of this ply 9. These widths are measured on the plies in question in a plane containing the axis of revolution yy'; these widths have not been provided with reference numbers in the drawing, for purposes of simplification.

The tire having the protective ply according to the invention may have different characteristics from those which have been previously described. Thus, for instance, the strengthening reinforcement in the crown may be formed of one ply or comprise more than two plies, each of these plies possibly having a structure different from that which has been described. One may also use more than one protective ply according to the invention in the same tire.

The tire according to the invention may be made, for instance, by building on a drum or in accordance with other techniques. This tire can be produced, for instance, by incorporating the protective ply or plies in the crown during a recapping. It also goes without saying that the invention applies to tires whose carcass is not radial, said carcass being, for instance, biased, in which case these tires may be without strengthening reinforcement in the crown.

The invention also applies to tires whose sidewalls are without strengthening reinforcement.

Of course, the invention is not limited to the embodiments which have been described above.

What is claimed is:

1. A tire with a crown comprising a strengthening reinforcement and at least one protective play arranged above the strengthening reinforcement, characterized by the fact that the protective play has the following features:
   (a) it comprises a three-dimensional fabric impregnated with rubber, said fabric having two principal faces;
   (b) the fabric comprises warp threads and woof threads;
   (c) the warp threads and the woof threads undulate;
   (d) when the general orientation of the fabric is flat, the principal faces of the fabric being then assumed flat, each warp thread undulates in a warp thread plane perpendicular to the principal faces of the fabric, each warp thread being alternately tangent to one of the principal faces of the fabric and then to the other, and the woof threads are arranged between the warp threads in several woof thread planes in the thickness of the fabric, the woof thread planes being parallel to the principal faces of the fabric, each woof thread undulates in a woof thread plane;
   (e) the warp threads and the woof threads are made with one or more materials whose rupture stress is less than 140 kg/mm$^2$; and
   (f) the porosity of the fabric before impregnation with rubber varies from 60% to 90%.

2. A tire according to claim 1, characterized by the fact that each warp thread has an average orientation in the direction of the length of the fabric.

3. A tire according to claim 1, characterized by the fact that each woof thread has an average orientation in the direction of the width of the fabric.

4. A tire according to claim 1, characterized by the fact that, in each plane in which woof threads undulate, the undulations of these woof threads are in phase.

5. A tire according to claim 1, characterized by the fact that the rubber has a Shore A hardness varying from 40 to 70, after vulcanization.

6. A tire according to claim 5, characterized by the fact that the rubber has a Shore A hardness varying from 50 to 60, after vulcanization.

7. A tire according to claim 1, characterized by the fact that in the vicinity of the equatorial plane of the tire, the warp threads are undulated in planes which are parallel to the equatorial plane.

8. A tire according to claim 1 or 7, characterized by the fact that in the vicinity of the equatorial plane of the tire, the woof threads are undulated in cylinders whose axis is the axis of revolution of the tire.

* * * * *

UNITED STATES PATENT AND TRADEMARK OFFICE
CERTIFICATE OF CORRECTION

PATENT NO. : 4,523,619

DATED : June 18, 1985

INVENTOR(S) : Jacques Gouttebessis

It is certified that error appears in the above-identified patent and that said Letters Patent is hereby corrected as shown below:

Col. 8, lines 41 and 43, each occurrence, "play" should read -- ply --.

Signed and Sealed this

Fifteenth Day of October 1985

[SEAL]

Attest:

DONALD J. QUIGG

Attesting Officer

Commissioner of Patents and Trademarks—Designate